United States Patent
Chen et al.

(10) Patent No.: US 10,983,266 B2
(45) Date of Patent: Apr. 20, 2021

(54) LIGHT BAR AND DISPLAY DEVICE

(71) Applicant: QISDA CORPORATION, Taoyuan (TW)

(72) Inventors: Hsiao-Yun Chen, Taoyuan (TW); Hsiao-Ping Sung, Taoyuan (TW); Yi-Cheng Kuo, Taoyuan (TW)

(73) Assignee: Qisda Corporation, Taoyuan (TW)

( * ) Notice: Subject to any disclaimer, the term of this patent is extended or adjusted under 35 U.S.C. 154(b) by 0 days.

(21) Appl. No.: 16/698,972

(22) Filed: Nov. 28, 2019

(65) Prior Publication Data

US 2020/0209465 A1 Jul. 2, 2020

(30) Foreign Application Priority Data

Dec. 27, 2018 (CN) .......................... 201811610215.X

(51) Int. Cl.
*G02B 6/00* (2006.01)
*F21V 8/00* (2006.01)
*H01R 12/71* (2011.01)

(52) U.S. Cl.
CPC ......... *G02B 6/0091* (2013.01); *G02B 6/0068* (2013.01); *H01R 12/716* (2013.01)

(58) Field of Classification Search
CPC ... G02B 6/0091; G02B 6/0068; H01R 12/716
USPC ......................................................... 362/613
See application file for complete search history.

(56) References Cited

U.S. PATENT DOCUMENTS

| 10,641,949 B2 * | 5/2020 | Sokolov | G02B 6/0085 |
| 2009/0316064 A1 * | 12/2009 | Kono | G02F 1/133615 |
| | | | 349/58 |
| 2010/0027255 A1 * | 2/2010 | Chang | G02B 6/0093 |
| | | | 362/235 |
| 2016/0370530 A1 * | 12/2016 | Shimizu | G02B 6/0088 |
| 2017/0003441 A1 * | 1/2017 | Choi | G02B 6/0091 |
| 2019/0293862 A1 * | 9/2019 | Sokolov | F21V 7/00 |

* cited by examiner

*Primary Examiner* — Christopher M Raabe

(57) ABSTRACT

A light bar includes a circuit board, a plurality of light emitting units, a connector and a frame module. The light emitting units are disposed on the circuit board. The connector is disposed on the circuit board. The frame module includes a plurality of frames arranged side by side. Each of the frames includes an accommodating recess. The circuit board is accommodated in the accommodating recess of each frame. The connector is located between a first end and a second end of the frame module, wherein the first end is opposite to the second end.

8 Claims, 5 Drawing Sheets

LIGHT BAR AND DISPLAY DEVICE

BACKGROUND OF THE INVENTION

1. Field of the Invention

The invention relates to a light bar and, more particularly, to a light bar equipped with a frame module consisting of a plurality of frames and a display device equipped with the light bar.

2. Description of the Prior Art

Referring to FIG. 1, FIG. 1 is a schematic top view illustrating a liquid crystal display device 3 of the prior art. Since the liquid crystal display device 3 has advantages of light weight, thin thickness, low power consumption and no radiation pollution, it has been applied in various electronic devices including notebook computer, computer screen, television, and so on. However, since the liquid crystal display device 3 is not an active light emitting display device, it needs to utilize a backlight module 30 to provide light for displaying images. In general, the backlight module 30 uses a light bar to be a light source. The conventional light bar disposes a circuit board in an accommodating recess of one single frame and disposes a connector 34, which is connected to a system board 32, at an edge of the circuit board. To accommodate the system board 32, a back casing 36 of the liquid crystal display device 3 must have a thick middle portion with a curved shape. If the connector 34 is located beside the light bar, the edge of the back casing 36 also has to accommodate the connector 34, such that the whole thickness of the liquid crystal display device 3 increases and it is disadvantageous to miniaturize the liquid crystal display device 3.

SUMMARY OF THE INVENTION

An objective of the invention is to provide a light bar equipped with a frame module consisting of a plurality of frames and a display device equipped with the light bar, so as to solve the aforesaid problems.

According to an embodiment of the invention, a light bar comprises a circuit board, a plurality of light emitting units, a connector and a frame module. The light emitting units are disposed on the circuit board. The connector is disposed on the circuit board. The frame module comprises a plurality of frames and the frames are arranged side by side. Each of the frames comprises an accommodating recess. The circuit board is accommodated in the accommodating recess of each frame. The connector is located between a first end and a second end of the frame module, wherein the first end is opposite to the second end.

According to another embodiment of the invention, a light bar comprises a circuit board, a plurality of light emitting units, a connector and a frame module. The light emitting units are disposed on the circuit board. The connector is disposed on the circuit board. The frame module is configured to accommodate the circuit board. The frame module comprises a first frame and a second frame. The first frame has a first end, a third end and a first accommodating recess, wherein the third end is opposite to the first end and the first accommodating recess is disposed between the first end and the third end. The second frame is connected to the first frame. The second frame has a second end, a fourth end and a second accommodating recess, wherein the fourth end is opposite to the second end and connected to the third end, and the second accommodating recess is disposed between the second end and the fourth end. The circuit board is accommodated in the first accommodating recess and the second accommodating recess, and the connector is located between the third end and the fourth end.

According to another embodiment of the invention, a display device comprises a backlight module, a display module, a system board and a back casing. The backlight module comprises a light bar and a light guide plate. The light bar comprises a circuit board, a plurality of light emitting units, a connector and a frame module. The light emitting units and the connector are disposed on the circuit board. The frame module comprises a first frame and a second frame. The first frame has a first end, a third end and a first accommodating recess, wherein the third end is opposite to the first end and the first accommodating recess is disposed between the first end and the third end. The second frame is connected to the first frame. The second frame has a second end, a fourth end and a second accommodating recess, wherein the fourth end is opposite to the second end and connected to the third end, and the second accommodating recess is disposed between the second end and the fourth end. The circuit board is accommodated in the first accommodating recess and the second accommodating recess, and the connector is located between the third end and the fourth end. An edge of the light guide plate is disposed in the first accommodating recess and the second accommodating recess and adjacent to the light emitting units. The display module is disposed at a first side of the backlight module and the system board is disposed at a second side of the backlight module, wherein the first side is opposite to the second side. The connector is connected to the system board. The back casing is disposed at the second side of the backlight module and covers the system board.

As mentioned in the above, the light bar of the invention is equipped with the frame module consisting of a plurality of frames. Accordingly, the invention can dispose the connector, which is connected to the system board, at any portion (e.g. middle portion) of the circuit board according to mechanical structure of the display device and then insert opposite ends of the circuit board into the accommodating recesses of different frames, respectively, so as to form the frame module by the frames. When the backlight module and the back casing are assembled, the connector of the light bar can be accommodated in a curved space of a thick middle portion of the back casing. Since the connector is not located at an edge of the light bar, the thickness of the edge of the back casing does not need to increase to accommodate the connector. Accordingly, the whole thickness of the display device can be reduced effectively, such that the invention is advantageous to miniaturize the display device.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
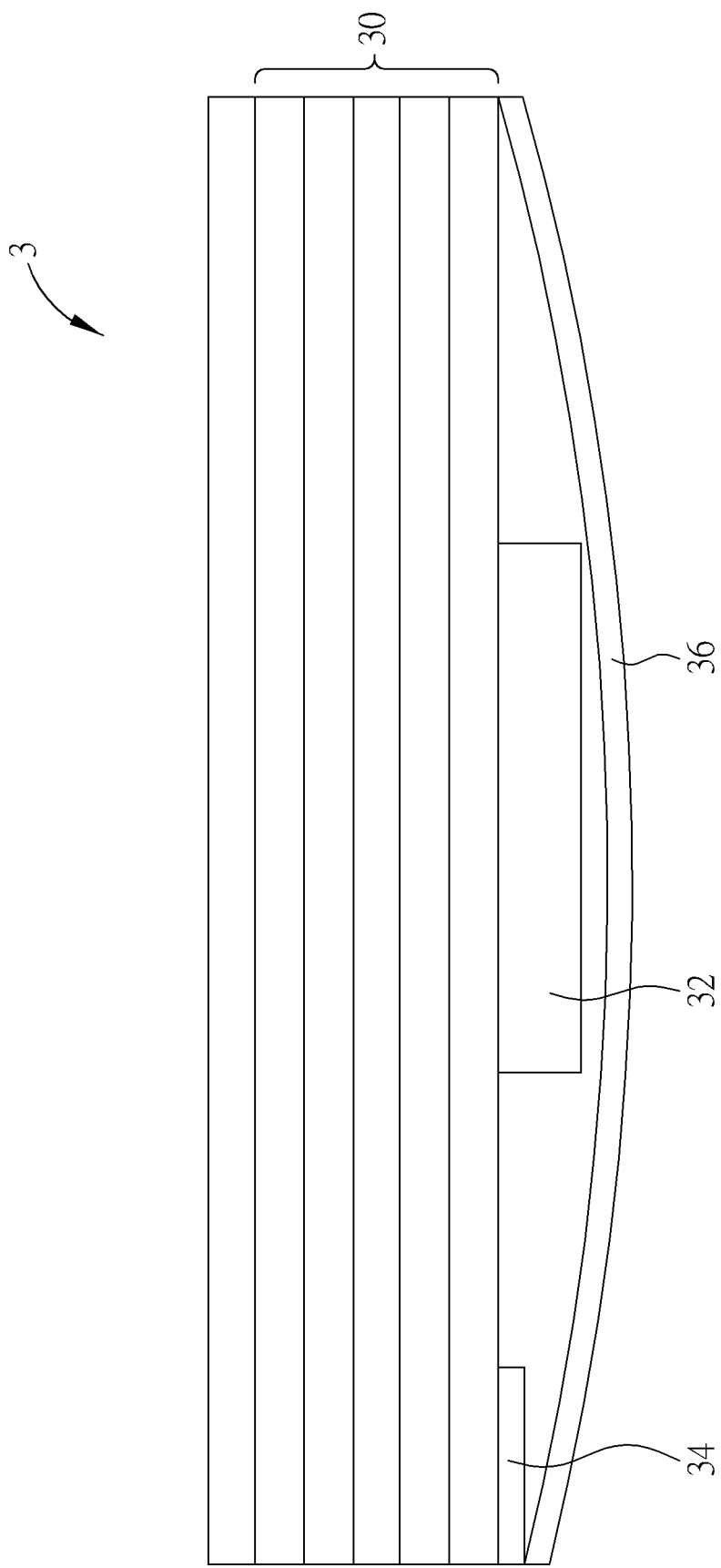
FIG. 1 is a schematic top view illustrating a liquid crystal display device of the prior art.
Figure 2:
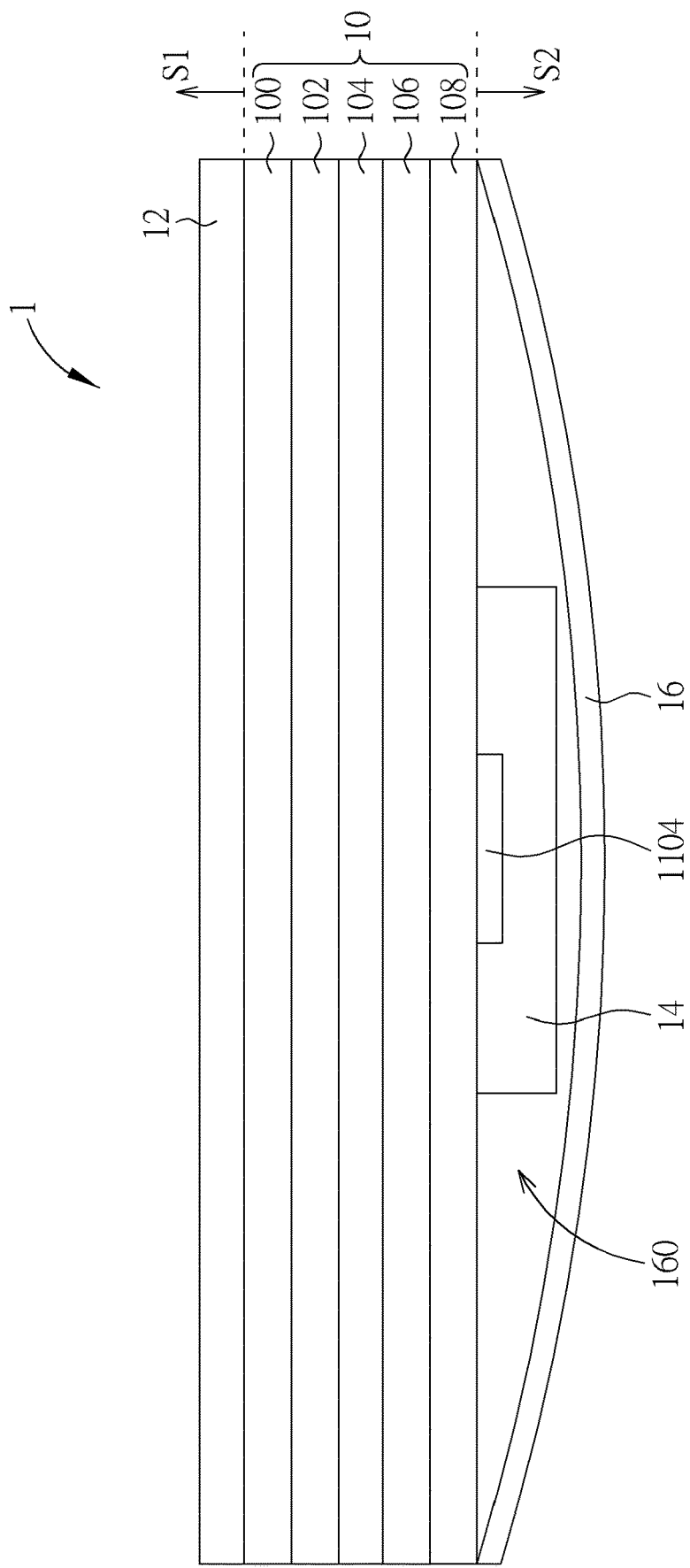
FIG. 2 is a schematic top view illustrating a display device according to an embodiment of the invention.
Figure 3:
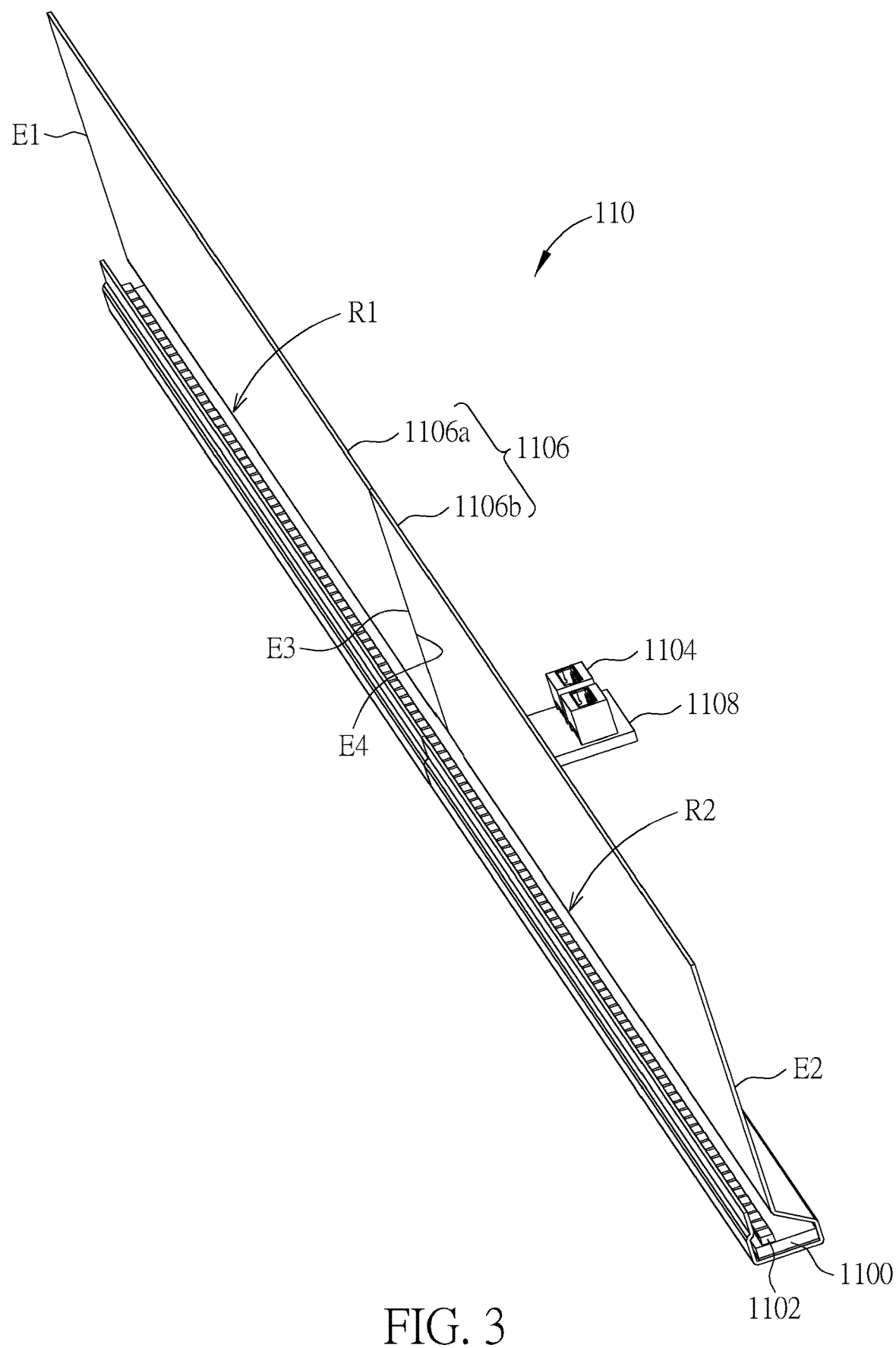
FIG. 3 is a perspective view illustrating a light bar according to an embodiment of the invention.
Figure 4:
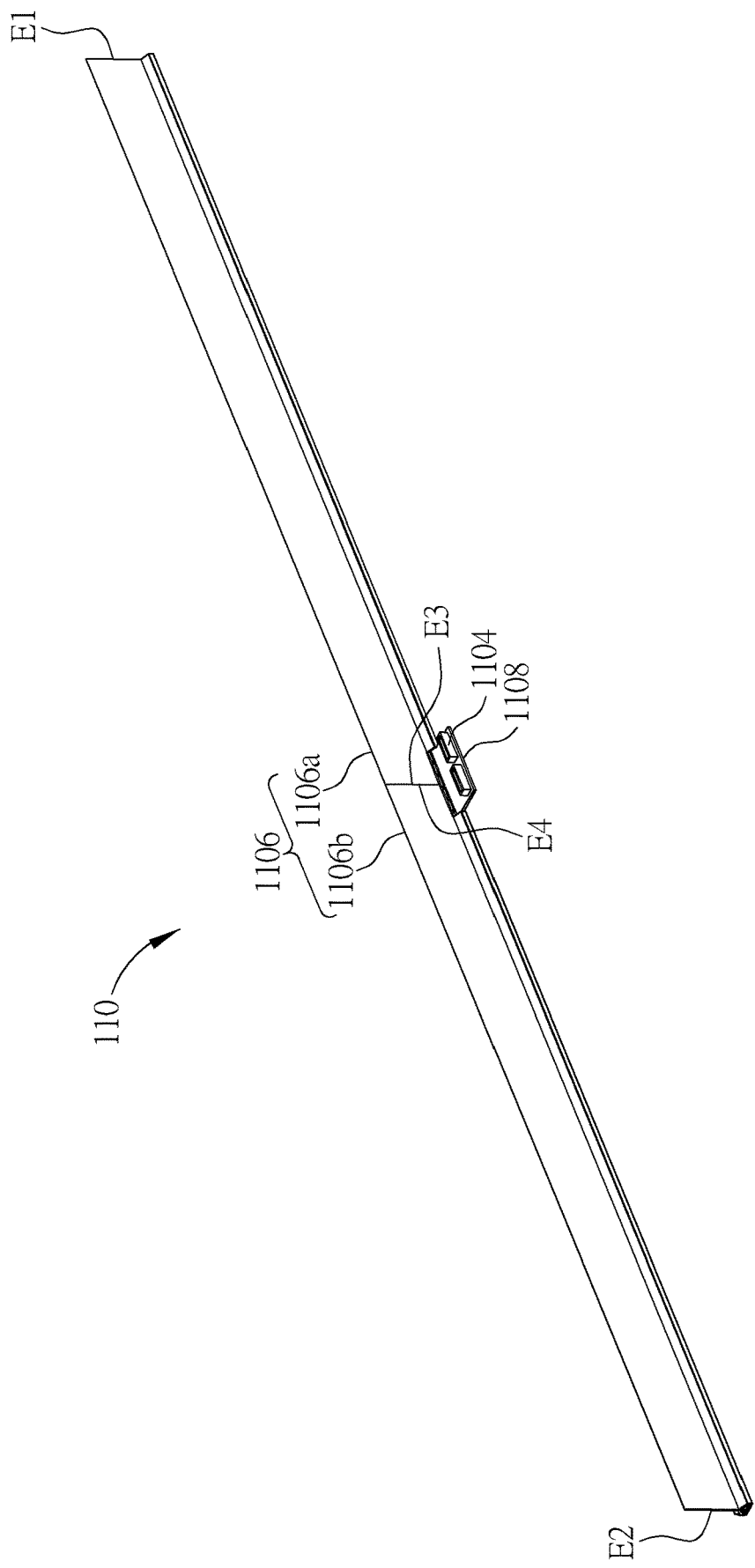
FIG. 4 is a perspective view illustrating the light bar shown in FIG. 3 from another viewing angle.
Figure 5:
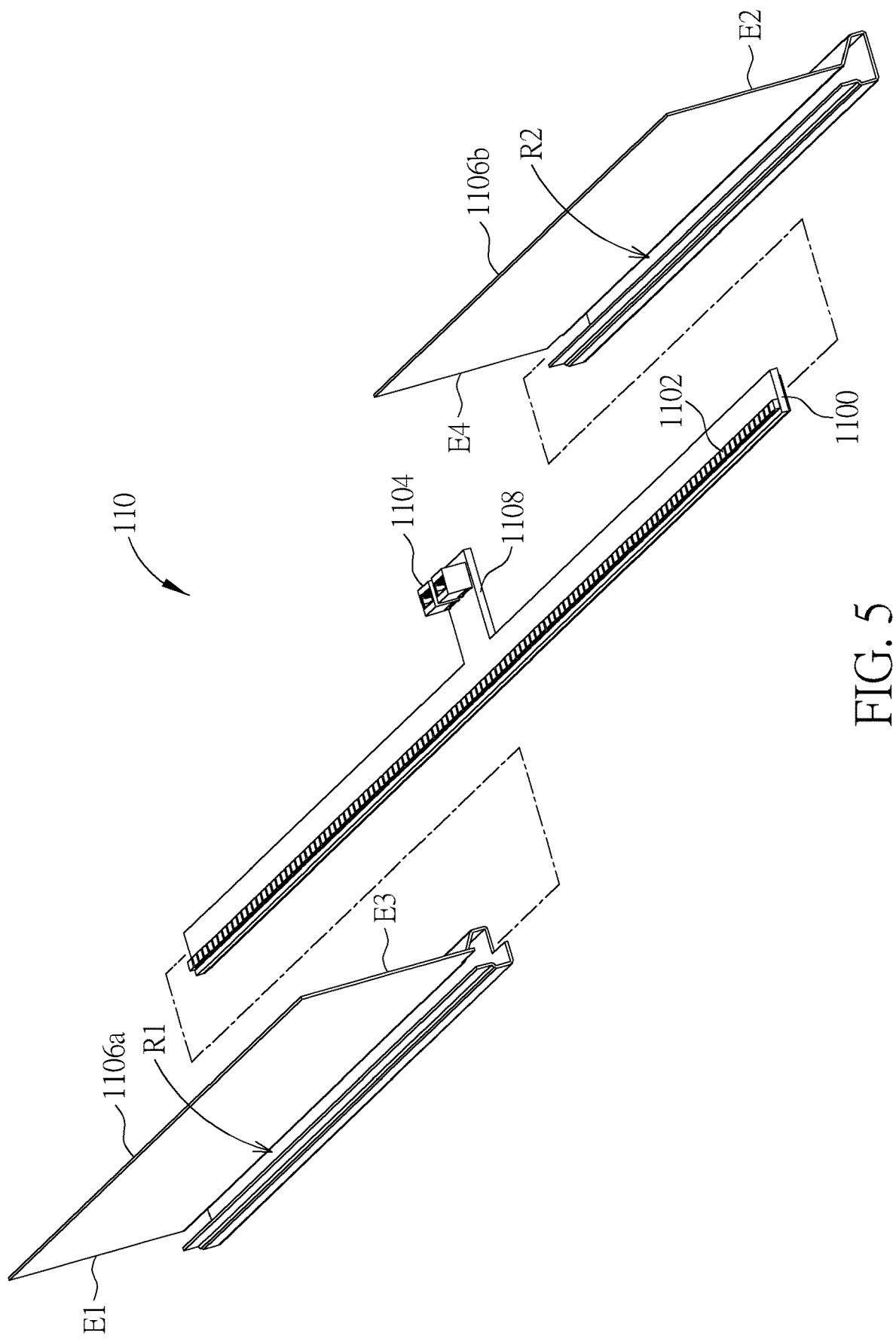
FIG. 5 is an exploded view illustrating the light bar shown in FIG. 3.

Referring to FIGS. 2 to 5, FIG. 2 is a schematic top view illustrating a display device 1 according to an embodiment of the invention, FIG. 3 is a perspective view illustrating a light bar 110 according to an embodiment of the invention, FIG. 4 is a perspective view illustrating the light bar 110 shown in FIG. 3 from another viewing angle, and FIG. 5 is an exploded view illustrating the light bar 110 shown in FIG. 3.

As shown in FIG. 2, the display device 1 comprises a backlight module 10, a display module 12, a system board 14 and a back casing 16. In this embodiment, the display device 1 may be a liquid crystal display device and the display module 12 may be a liquid crystal display module. The display module 12 is disposed at a first side S1 of the backlight module 10 and the system board 14 is disposed at a second side S2 of the backlight module 10, wherein the first side S1 is opposite to the second side S2. The back casing 16 is disposed at the second side S2 of the backlight module 10 and covers the system board 14. In this embodiment, the back casing 16 may have a thick middle portion with a curved shape, such that the system board 14 may be accommodated in a curved space 160 of the thick middle portion of the back casing 16.

The backlight module 10 may comprise a front bezel 100, an optical film assembly 102, a light guide plate 104, a reflective sheet 106, a back plate 108 and a light bar 110 (as shown in FIGS. 3 to 5). In this embodiment, the display module 12 may be assembled to the front bezel 100 of the backlight module 10 and the back casing 16 may be assembled to the back plate 108 of the backlight module 10. The optical film assembly 102 may comprise lots of optical films including a prism film, a diffusing film, and so on according to practical applications.

As shown in FIGS. 3 to 5, the light bar 110 comprises a circuit board 1100, a plurality of light emitting units 1102, a connector 1104 and a frame module 1106. In this embodiment, the light bar 1100 may comprise two connectors 1104, but is not so limited. In practical applications, the number of connectors 1104 may be one or more. The light emitting units 1102 and the connectors 1104 are disposed on the circuit board 1100. In practical applications, the light emitting units 1102 may be light emitting diodes or other light sources. In this embodiment, the circuit board 1100 may comprise a protruding portion 1108 and the connectors 1104 may be disposed on the protruding portion 1108.

The frame module 1106 comprises a plurality of frames and the frames are arranged side by side. In this embodiment, the frame module 1106 may comprise a first frame 1106a and a second frame 1106b. After assembling the light bar 110, the first frame 1106a and the second frame 1106b are arranged side by side, as shown in FIGS. 3 and 4. The first frame 1106a has a first end E1, a third end E3 and a first accommodating recess R1, wherein the third end E3 is opposite to the first end E1 and the first accommodating recess R1 is disposed between the first end E1 and the third end E3. The second frame 1106b has a second end E2, a fourth end E4 and a second accommodating recess R2, wherein the fourth end E4 is opposite to the second end E2 and the second accommodating recess R2 is disposed between the second end E2 and the fourth end E4. In this embodiment, a length of the first frame 1106a may be equal or unequal to a length of the second frame 1106b according to practical applications.

The invention can dispose the connectors 1104, which is connected to the system board 14, at any portion (e.g. middle portion) of the circuit board 1100 according to mechanical structure of the display device 1 and then insert opposite ends of the circuit board 1100 into the first accommodating recesses R1 of the first frame 1106a and the second accommodating recesses R2 of the second frame 1106b, respectively, so as to form the frame module 1106 by the first frame 1106a and the second frame 1106b. Since the first frame 1106a and the second frame 1106b are assembled to the circuit board 1100 from opposite ends, the connectors 1104 located at any portion (e.g. middle portion) of the circuit board 1100 do not interfere with the first frame 1106a and the second frame 1106b.

After assembling the light bar 110, the fourth end E4 of the second frame 1106b is connected to the third end E3 of the first frame 1106a. At this time, the circuit board 110 is accommodated in the first accommodating recess R1 of the first frame 1106a and the second accommodating recess R2 of the second frame 1106b, and the connectors 1104 are located between the third end E3 of the first frame 1106a and the fourth end E4 of the second frame 1106b. Furthermore, since the first end E1 of the first frame 1106a and the second end E2 of the second frame 1106b are the first end E1 and the second end E2 of the frame module 1106, the connectors 1104 are also located between the first end E1 and the second E2 of the frame module 1106.

In this embodiment, the edges of the light guide plate 104 and the reflective sheet 106 shown in FIG. 2 may be disposed in the first accommodating recess R1 of the first frame 1106a and the second accommodating recess R2 of the second frame 1106b and adjacent to the light emitting units 1102. Accordingly, light emitted by the light emitting units 1102 is guided to the optical film assembly 102 by the light guide plate 104 and then passes through the optical film assembly 102 to the display module 12. Furthermore, as shown in FIG. 2, after assembling the display device 1, the connector 1104 is connected to the system board 14 (e.g. motherboard), so as to control the light bar 110 through the system board 14.

In this embodiment, a projection of the connector 1104 towards the system board 14 is located within an area range of the system board 14, as shown in FIG. 2. Accordingly, when the backlight module 10 and the back casing 16 are assembled, the connector 1104 can be accommodated in the curved space 160 of the thick middle portion of the back casing 16, together with the system board 14. Thus, the thickness of the edge of the back casing 16 does not need to increase to accommodate the connector 1104. Accordingly, the whole thickness of the display device 1 can be reduced effectively, such that the invention is advantageous to miniaturize the display device 1.

As mentioned in the above, the light bar of the invention is equipped with the frame module consisting of a plurality of frames. Accordingly, the invention can dispose the connector, which is connected to the system board, at any portion (e.g. middle portion) of the circuit board according to mechanical structure of the display device and then insert opposite ends of the circuit board into the accommodating recesses of different frames, respectively, so as to form the frame module by the frames. When the backlight module and the back casing are assembled, the connector of the light bar can be accommodated in a curved space of a thick middle portion of the back casing. Since the connector is not located at an edge of the light bar, the thickness of the edge of the back casing does not need to increase to accommodate the connector. Accordingly, the whole thickness of the display device can be reduced effectively, such that the invention is advantageous to miniaturize the display device.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A light bar comprising:
   a circuit board;
   a plurality of light emitting units disposed on the circuit board;
   a connector disposed on the circuit board; and
   a frame module comprising a plurality of frames separatably connected to each other, the frames being arranged side by side, each of the frames comprising an accommodating recess, the plurality of frames being installed on the circuit board from two opposite ends of the circuit board along two different directions, so that the circuit board is accommodated in the accommodating recess of each frame, the connector being located between a first end and a second end of the frame module, the first end being opposite to the second end.

2. The light bar of claim 1, wherein the circuit board comprises a protruding portion and the connector is disposed on the protruding portion.

3. A light bar comprising:
   a circuit board;
   a plurality of light emitting units disposed on the circuit board;
   a connector disposed on the circuit board; and
   a frame module configured to accommodate the circuit board, the frame module comprising:
      a first frame having:
         a first end;
         a third end opposite to the first end; and
         a first accommodating recess disposed between the first end and the third end; and
      a second frame separatably connected to the first frame, the second frame having:
         a second end;
         a fourth end opposite to the second end and separatably connected to the third end; and
         a second accommodating recess disposed between the second end and the fourth end; and
   wherein the first frame and the second frame are installed on the circuit board from two opposite ends of the circuit board along two different directions, so that the circuit board is accommodated in the first accommodating recess and the second accommodating recess, and the connector is located between the third end and the fourth end.

4. The light bar of claim 3, wherein the circuit board comprises a protruding portion and the connector is disposed on the protruding portion.

5. A display device comprising:
   a backlight module comprising a light bar and a light guide plate, the light bar comprising a circuit board, a plurality of light emitting units, a connector and a frame module, the light emitting units and the connector being disposed on the circuit board, the frame module comprising:
      a first frame having:
         a first end;
         a third end opposite to the first end; and
         a first accommodating recess disposed between the first end and the third end; and
      a second frame separatably connected to the first frame, the second frame having:
         a second end;
         a fourth end opposite to the second end and separatably connected to the third end; and
         a second accommodating recess disposed between the second end and the fourth end; and
   wherein the first frame and the second frame are installed on the circuit board from two opposite ends of the circuit board along two different directions, so that the circuit board is accommodated in the first accommodating recess and the second accommodating recess, the connector is located between the third end and the fourth end, and an edge of the light guide plate is disposed in the first accommodating recess and the second accommodating recess and adjacent to the light emitting units;
   a display module disposed at a first side of the backlight module;
   a system board disposed at a second side of the backlight module, the first side being opposite to the second side, the connector being connected to the system board; and
   a back casing disposed at the second side of the backlight module and covering the system board.

6. The display device of claim 5, wherein the circuit board comprises a protruding portion and the connector is disposed on the protruding portion.

7. The display device of claim 5, wherein a projection of the connector is located within an area range of the system board.

8. The display device of claim 5, wherein a length of the first frame is equal or unequal to a length of the second frame.

* * * * *